United States Patent [19]

Jezl et al.

[11] E Re. 30,148

[45] Reissued Nov. 13, 1979

[54] MELT FINISHING PROCESS FOR POLYMERS PRODUCED BY VAPOR STATE POLYMERIZATION PROCESSES

[75] Inventors: James L. Jezl, Winfield; Edwin F. Peters, St. Charles, both of Ill.

[73] Assignee: Standard Oil Company (Indiana), Chicago, Ill.

[21] Appl. No.: 925,605

[22] Filed: Jul. 17, 1978

Related U.S. Patent Documents

Reissue of:

[64] Patent No.: 3,970,611
Issued: Jul. 20, 1976
Appl. No.: 533,022
Filed: Dec. 16, 1974

[51] Int. Cl.[2] ..... C08F 2/34; C08F 6/00; C08F 10/00; C08F 14/06

[52] U.S. Cl. ..... 526/65; 526/66; 526/67; 526/68; 526/70; 526/73; 526/86; 526/88; 526/344; 526/346; 526/351; 526/352; 526/901; 526/902; 526/905; 526/918; 526/922; 528/499; 528/501; 528/503

[58] Field of Search ..... 526/65, 67, 68, 70, 526/73, 88, 901, 902, 905, 918, 922; 528/499, 501, 503

[56] References Cited

U.S. PATENT DOCUMENTS

| | | | |
|---|---|---|---|
| 2,936,303 | 5/1960 | Goins | 260/94.9 P |
| 3,023,203 | 2/1962 | Dye | 260/94.9 P |
| 3,049,527 | 8/1962 | Powelson | 260/94.9 P |
| 3,078,261 | 2/1963 | Wisseroth et al. | 260/92.8 R |
| 3,338,986 | 8/1967 | Leibson et al. | 260/94.9 P |
| 3,469,948 | 9/1969 | Anderson et al. | 260/94.9 P |
| 3,514,501 | 5/1970 | Leibson et al. | 526/65 |
| 3,522,227 | 7/1970 | Thomas | 260/92.8 R |
| 3,625,932 | 12/1971 | Green | 260/92.8 R |
| 3,652,527 | 3/1972 | Trieschmann et al. | 260/94.9 P |
| 3,770,714 | 11/1973 | Dorschner et al. | 260/94.9 P |
| 3,944,534 | 3/1976 | Sennari et al. | 526/88 |
| 3,957,448 | 5/1976 | Shepard et al. | 526/65 |
| 3,965,083 | 6/1976 | Jezl et al. | 526/65 |
| 3,971,768 | 7/1976 | Peters et al. | 526/68 |
| 4,012,573 | 3/1977 | Trieschmann et al. | 526/67 |
| 4,101,289 | 7/1978 | Jezl et al. | 526/67 |
| 4,129,701 | 12/1978 | Jezl et al. | 526/70 |
| 4,130,699 | 12/1978 | Hoff et al. | 526/70 |

*Primary Examiner*—Alan Holler
*Attorney, Agent, or Firm*—William H. Magidson; Arthur G. Gilkes; William T. McClain

[57] ABSTRACT

A melt finish process is disclosed herein for working up solid, particulate polymer from a vapor state polymerization reactor, which reactor employs high yield catalysts, whereby the polymer is moved out of the reactor and into a post polymerization zone characterized by essentially adiabatic polymerization and the heat of such polymerization is used in raising the temperature of and melting said solid, particulate polymer to form molten polymer for further processing.

22 Claims, 2 Drawing Figures

MELT FINISHING PROCESS FOR POLYMERS PRODUCED BY VAPOR STATE POLYMERIZATION PROCESSES

Matter enclosed in heavy brackets [ ] appears in the original patent but forms no part of this reissue specification; matter printed in italics indicates the additions made by reissue.

SUMMARY OF THE INVENTION

This invention relates to a novel process for efficiently supplying heat to particulate, solid polymer exiting from a vapor phase reactor so that such polymer is melted and raised to a temperature sufficient for efficient transfer of the molten polymer through a series of melt finishing steps and, more specifically, relates to a novel process for treating solid, particulate polymer exiting from a vapor state polymerization reactor, which process involves utilizing a post polymerization zone following the reactor into which the solid, particulate polymer is moved without substantial pressure letdown and into which additional monomer is added and polymerization is allowed to occur in an essentially adiabatic fashion so that said solid, particulate polymer is raised in temperature and melted to form molten polymer for further processing.

In accordance with the instant invention, solid, particulate polymer, removed from a vapor phase reactor without substantial pressure letdown, is efficiently raised in temperature and melted in a post polymerization zone wherein further, essentially adiabatic polymerization of monomer from the reactor vapors and additional added monomer is allowed to take place producing localized heating to raise the temperature of said solid, particulate polymer to form an easily flowable polymer melt. Additionally, the molten polymer may thereafter be treated with a catalyst decomposing substance and other additives such as stabilizers and colorants, devolatilized, and the molten product therefrom cooled and formed into commercial size polymer products.

BACKGROUND OF THE INVENTION

One of the problems in the solution or slurry polymerization of monomer is the capital costs required in the production thereof. Monomer polymerization using a vapor phase process can be considerably more economical if certain problems inherent in vapor state polymerization can be solved. In vapor state processes using high yield catalysts and cocatalysts, i.e., processes yielding polymer from which catalyst and cocatalyst residues need not be removed, particulate, solid polymer is removed from the reactor and then, after decomposition of the catalyst and cocatalyst, melt extruded along with additives to form commercially useful product. A useful saving on heat requirements can be obtained if the solid particulate polymer is melted directly without intermediate cooling upon leaving the reactor and thereafter all finishing operations carried out on the molten polymer. However, melting of the polymer from the reactor by externally supplied heat is inefficient because of the low thermal conductivity and low rate of heat transfer through such particulate polymeric solids and melted polymer.

Now it has been found that by supplying an important fraction of the additional heat required to raise the temperature of the solid particulate polymer exiting the reactor to above the polymer melting point by an essentially adiabatic polymerization in a post polymerization zone, an extremely efficient method of forming molten polymer suitable for melt finishing results. An additional benefit obtained by such post reactor polymer melting is an improvement in the purity of the final product because the post polymerization melting partially devolatilizes the polymer prior to the catalyst decomposition step. Thus, important economic benefits are realized through savings in energy consumption, raw materials and capital equipment.

SHORT DESCRIPTION OF THE DRAWING

STATEMENT OF THE INVENTION

The process of the instant invention involves a post reactor adiabatic polymerization utilizing the variable amount of heat of polymerization therefrom to aid in melting and raising the temperature of solid, particulate polymer removed from a vapor phase reactor. Such polymer is removed to the post-polymerization zone together with reactor off-gases wherein the polymerization is allowed to proceed in the presence of additional added monomer in an essentially adiabatic fashion. The temperature rise in the post-polymerization zone depends upon the monomer being polymerized, the amount of polymerization accomplished in the post-polymerization zone and the presence of externally added heat. The polymer is thereby melted and raised to a temperature sufficient for efficient transfer in a molten state through a number of polymer finishing steps.

By the term vapor state reactor or process is meant a reactor or process, the monomer or monomers of which are vapors or gases.

Figure 1:
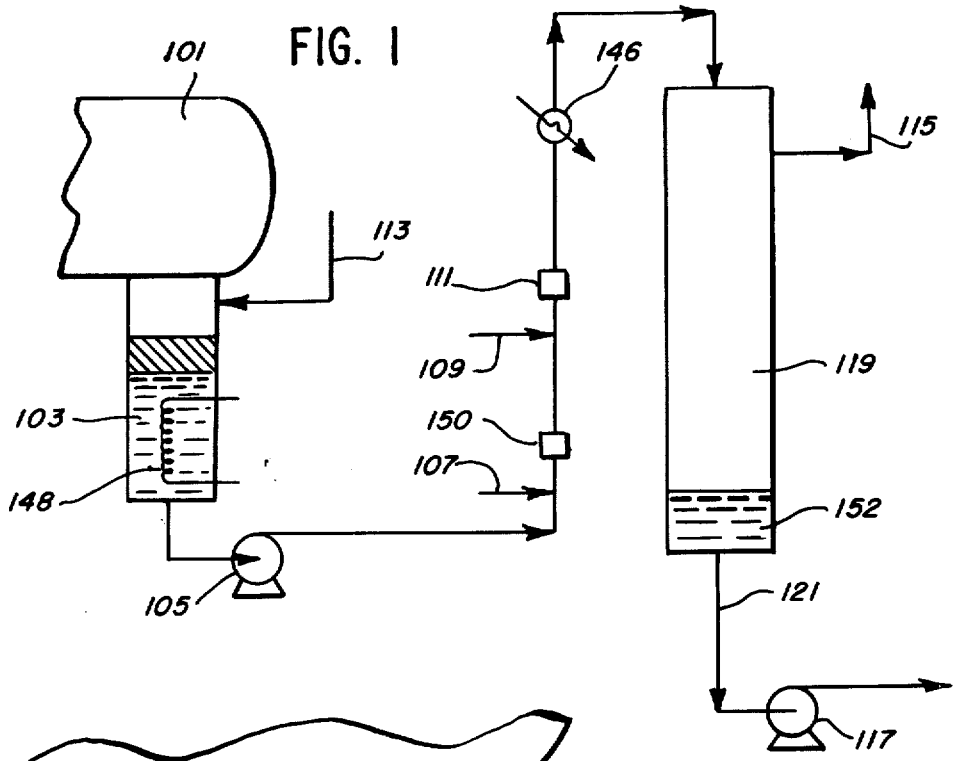
FIG. 1 shows a flow diagram of one embodiment of the instant invention.

In FIG. 1 particulate, solid polymer is removed without substantial pressure letdown from vapor phase reactor 101 into the post-polymerization zone, polymer take-off vessel 103, together with some reactor off-gases. Monomer in such off-gases and monomer added through line 113 are further polymerized in such zone as the particulate contains some still active catalyst and cocatalyst, if such is used. This post polymerization is accomplished in an essentially adiabatic manner and provides for extremely efficient heat transfer to the solid polymer as the heat of polymerization is essentially homogeneously produced throughout the polymer particulate at the individual polymerization sites.

Depending upon the rate of polymer removal from the reactor, the rate of monomer addition through line 113, the amount of still active catalyst, etc., the heat of polymerization contributes a larger or smaller, or even all of the, amount of the heat required to melt the polymer. Additional heat is generally added, heater 148, to raise the molten polymer in take-off vessel 103 to a temperature range in which the molten polymer can be efficiently transferred to further finishing steps.

Aside from the efficient manner of raising the polymer temperature in take-off vessel 103 provided by the post polymerization step, the melting of the polymer exiting via melt pump 105 substantially frees it of monomer and, if used, much of the quench liquid (in a quench-cooled mode of reactor operation) and hydrogen. A quench-cooled, polymerization reactor and process particularly suitable for use with the process taught herein is described in U.S. patent application Ser. No. 533,018, filed Dec. 16, 1974, filed on the same date as this application in the names J. L. Jezl, E. F. Peters, R. D. Hall and J. W. Shepard, the subject matter of which is by reference specifically incorporated herein. This predevolatilizing by the melting process in take-off vessel 103 provides for a cleaner polymer product as catalyst residues resulting from the catalyst decomposition step and occluded quench liquid, if used, are less.

The polymer is then beneficially pumped to mixer 150 where catalyst decomposing material, generally water, from line 107 is admixed with the molten polymer. Thereafter, additives such as stabilizers and colorants can be added separately or as a mixture via line 109 and such additives are admixed with the molten polymer in mixer 111. However, such additives may be added after the devolatilization step.

In a beneficially utilized variant both decomposing substance and additives can be introduced together slurried in an inert volatilizable vehicle such as hexane and the like. In such case the combination is admixed with the molten polymer prior to the devolatilization step.

Thereafter the molten polymer is beneficially heated by heat exchanger 146 and put through devolatilizer 119 which in a beneficial mode of operation is equipped so that the molten polymer extrudes through a stranding die at the top of tower 119. The strings of molten polymer exiting from the die fall to the bottom and are devolatilized by vacuum as they fall. The volatiles, such as catalyst decomposition products, hydrogen, if used, monomer, etc., are removed through line 115. Alternatively, a purge line may be added to 119 to sweep volatiles out line 115 using steam, nitrogen or another inert material.

One beneficial effect in the use of the instant process for the polymerization of ethene using hydrogen is that a substantial amount of any ethane produced by hydrogenation of the ethene during polymerization is carried out of reactor 101 admixed with the polymer and is exhausted in this devolatilization step.

Molten polymer 152 in the bottom of tower 119 is then removed through line 121 by melt pump 117 to be cooled and pelletized or otherwise converted to a commerical form.

In the use of the invention for finishing polyethene, melt temperatures are above about 265° F. at the bottom of take-off vessel 103, above about 300° F. in the catalyst decomposition region and up to about 550° F. in devolatilizer 119. In the use of the invention for finishing polypropene, melt temperatures are above about 330° F. at the bottom of take-off vessel 103, above about 350° F. in the catalyst decomposition region and up to about 550° F. at the bottom of devolatilizer 119. For various polymers, these temperatures will be different depending upon the melting or softening temperature, the viscosity of the polymer melt and the exact character of the steps following melting as may be understood by one skilled in this art.

Figure 2:
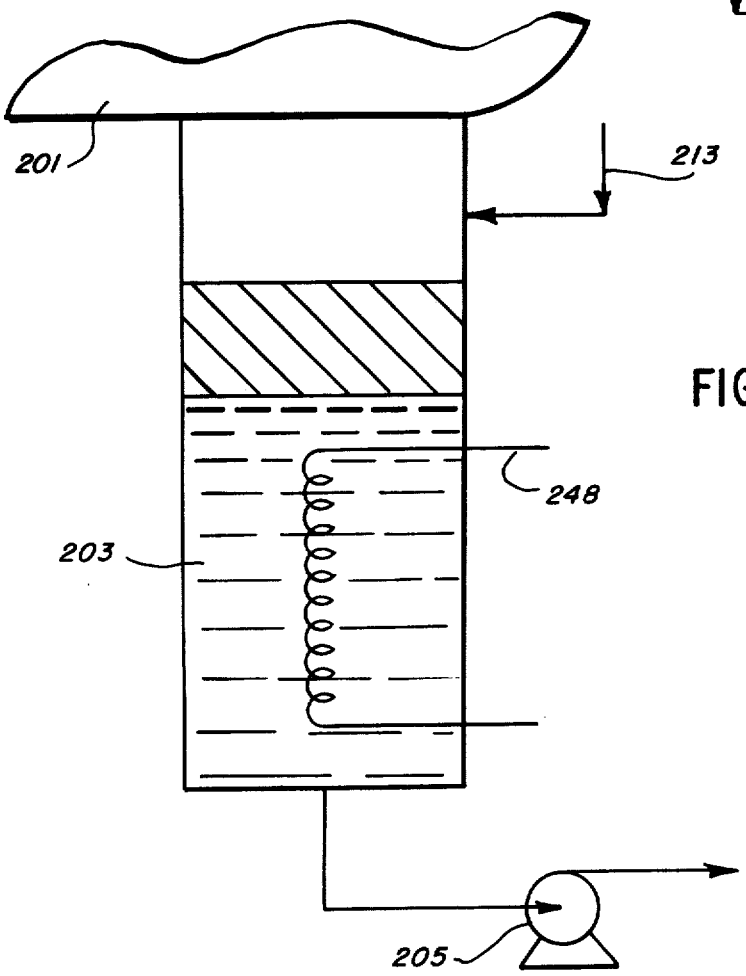
FIG. 2 shows an enlarged view of the post-polymerization zone (melter).

FIG. 2 shows the polymer solid and molten polymer layers in take-off vessel 203.

The process described herein may be applied to the polymerization of polymerizable monomers which are polymerizable below the softening points of their polymeric forms including ethene, propene, 4-methyl-pentene-1, butene-1, vinyl chloride, butadienes, styrene, polyethyleneterephthalate and mixtures of such monomers. Particularly suitable is its use in the polymerization of ethene and propene.

In general, the catalysts which are most useful to the process described herein are those which are very active and give a high yield on catalyst. Included in this group for olefin polymerization are cocatalysts composed of organometallic compounds of Periodic Groups IA, IIA and IIIA and catalysts which are based on transition metal compounds. Aluminum alkyl compound cocatalysts are especially preferred and include trialkylaluminums and alkylaluminum halides such as a dialkylaluminum chloride. The transition metal catalyst can be a metal compound of Group IV or Group V such as a titanium or vanadium compound, a compound of Group VI such as chromium or molybdenum oxide or may be one of the above transition metal compounds supported on a magnesium-based support or a support such as alumina, silica or silica-alumina.

The preferred catalysts and cocatalysts are as aforesaid high yield catalysts. By high yield is meant catalysts and cocatalysts the residues of which do not have to be removed from the products of the process.

The preferred catalysts and cocatalysts for ethene polymerization are a trialkylaluminum cocatalyst with a catalyst which is a titanium compound supported on magnesium-based support or chromium oxide supported on alumina, silica or silica-alumina. For propene polymerization it is preferable to use a dialkylaluminum chloride cocatalyst and a catalyst which is an active titanium trichloride. However, the process and apparatus described herein are not meant to be limited to the catalysts used except in that the process operates best for high yield catalysts.

While the invention is described in connection with the specific Examples below, it is to be understood that these are for illustrative purposes only. Many alternatives, modifications, and variations will be apparent to those skilled in the art and such alternatives, modifications and variations fall within the spirit and scope of the appended claims.

EXAMPLE 1

A supported titanium chloride catalyst was suspended in isopentane at a concentration of 30 milligrams/liter and pumped continuously to a horizontal, stirred-bed, vapor phase reactor at a rate of 300 milliliters/hour. Aluminum triethyl diluted with isopentane to 1000 milligrams/liter was pumped continuously at a rate to maintain the desired weight ratio of aluminum triethyl/catalyst, 3/1 to 15/1. Ethylene was charged continuously at the rate of polymerization to maintain pressure, 300 psig. A continuous stream of gas, 0.3 cubic feet/hour, was removed from the reactor for gas chromatographic analysis to maintain the hydrogen concentration in the reactor at 34 mol percent by intermittent hydrogen addition for polymer molecular weight control. The reactor polymer bed temperature was held at 160° F. by continuously spraying isopentane at the appropriate rate onto the 30 R.P.M. stirred polymer bed. The vaporized isopentane was condensed and recycled. The noncondensed gas (40° to 50° F.) was continuously recycled back into the bottom of the stirred polymer bed. The polymer bed level was maintained by the opening position in a retaining weir. The polymer overflow spilled out into the melter which was maintained at 350° to 400° F. by a combination of polymerization heat and external electrical heat. The melted polymer sumps to the bottom and was forced through a horizontal piece of ¾ inch diameter × 4 foot long pipe at 400° to 500° F. by the reactor pressure. Water was injected continuously into the polymer melt between the melter and catalyst deactivator at a rate of 10 milliliters/hour. Polymer melt extrudes from the catalyst deactivator through a ⅜ inch diameter opening and is drawn through a water bath and chopped. Polymer was produced at the rate of 1 to 3 pounds/hour, at a yield level of 100,000 grams polymer/gram of catalyst. Physical properties of the polymer taken out of the melter are shown below in Table I and some properties of the polymer from the reactor are shown in Table II.

TABLE I

Conditions: 160° F. 300 psig. 34 mol percent $H_2$, 13/1 to 15/1 triethyl aluminum/catalyst weight ratio

| General Properties | Run A | Run B[1] |
|---|---|---|
| Unannealed density, grams/cubic centimeter | 0.961 | 0.959 |
| Annealed density, grams/cubic centimeter | 0.977 | 0.977 |
| Inherent viscosity, dl/gram | 1.87 | 2.29 |
| Melt index, $MF_1$, grams/10 minutes | 0.92 | 0.44 |
| Melt index, $MF_{10}$, grams/10 minutes | 38 | 24 |
| Flow rate ratio, $MF_{10}/MF_1$ | 41.4 | 54.5 |
| Hexane extractables, weight percent | 0.47 | 0.41 |
| Oven volatiles content, weight percent | 0.20 | 0.28 |
| Stiffness, psig | 165,000 | 160,000 |
| Molecular Weight Parameters, GPC | | |
| Molecular weight distribution, Mw/Mn | 7.6 | 10.5 |
| Tensile Properties | | |
| Tensile strength at yield, psig at 2 inches/minute | 4540 | 4600 |
| Tensile strength at ultimate, psig at 2 inches/minute | 3410 | 2810 |
| Elongation at yield, percent at 2 inches minute | 10 | 11 |
| Elongation at ultimate, percent at 2 inches/minute | 1200 | 689 |
| Impact Properties | | |
| Tensile impact strength, ft.lb/in$^2$ | 65 | 88 |
| Izod impact strength, ft.lb/in notch | 9.2 | 9.8 |
| Thermal Properties | | |
| Vicat softening point °F. | 266 | 262 |
| Brittleness temperature °C. | — | — |

[1]Triethylaluminum/catalyst weight ratio = 6/1 to 3.75/1

TABLE II

Conditions: 160° F. 300 psig. 34 mol percent $H_2$, 13/1 to 14/1 triethylaluminum/catalyst weight ratio

| | RUN A | | | |
|---|---|---|---|---|
| Cut number | 5R | 8R | 10R | RUN B |
| Total polymer produced, grams | 3628 | 5509 | 6637 | 1952 |
| Inventory turnover (No of times) | 3.0 | 4.6 | 5.5 | 1.6 |
| Percent original inventory remaining | 5 | 1 | 0.4 | 20 |
| Bulk density grams/cubic centimeter | 0.36 | 0.37 | 0.37 | 0.41 |
| $MF_{10}$ | 28.7 | 38.7 | 48.2 | — |
| MF, | 0.89 | 1.0 | 1.3 | — |
| $MF_{110}/MF_1$ | 32.3 | 38.7 | 37.1 | — |

EXAMPLE II

A horizontal, stirred-bed carbon steel reactor approximately 2 feet in diameter by 3.0 feet in length equipped with gas recycle and quench liquid recycle capabilities was used in this continuous ethylene-propylene polymerization. Temperatures were 181° F. at one end of the reactor, 171° F. at the center of the reactor and 181° F. near the take-off weir end and reactor total pressure was 400 psig. Ethylene was fed to the reactor at 20.57 pounds/hour and propylene was added at 0.29 pounds per hour. The recycle gas rate was 2.29 actual cubic feet per minute and the recycle quench liquid, isopentane, rate was 0.29 gallons/minute. The supported titanium catalyst was added at about 0.3 grams per hour as a dilute slurry in isopentane. The amount of slurry added was about 3 gallons per hour. Triethylaluminum cocatalyst was added as a solution in isopentane at a rate of 35 milliliters per hours at a concentration of 0.025 grams triethylaluminum per milliliter.

Gas analyses of reactor recycle gases were continuously made and typical values were: hydrogen, 37 mol percent; ethane, 0.3 mol percent; propene, 1.1 mol percent; isopentane, 1 mol percent and ethene, 60.6 mol percent.

The melt index of product was about 0.58 grams/10 minutes.

EXAMPLE III

Ethylene was polymerized in the same manner described in EXAMPLE 1. The catalyst was 2.0 weight percent chromium trioxide on W. R. Grace No. 952 $SiO_2$. Catalyst was calcined at 1200° F. with dry oxygen for 12 hours. Catalyst, triisobutylaluminum and ethylene were continuously charged to the reactor at 210° F. under 300 psig, pressure. Hydrogen was charged as needed to maintain 35 mol percent $H_2$ in the reactor. The mole ratio of $Al(i\text{-}Bu)_3/CrO_3$ was 3. The polymer yield based on catalyst was 4,600 grams/gram. Polymer was removed continuously as a melt. The polymer produced showed the following physical properties:

TABLE III

| Cut | M.L. | $MF_{10}$ | $MF_{10}/MF_1$ | Wt. Percent Extractables | Wt. Percent Volatiles | Mw/Mn |
|---|---|---|---|---|---|---|
| 5 | 0.22 | 22.2 | 111 | 15 | 0.65 | 14.7 |
| 6 | 0.12 | 16.6 | 138 | 1.6 | 0.87 | 17.0 |
| 7 | 0.12 | 20.2 | 168 | 1.8 | 0.98 | 15.4 |

EXAMPLE IV

Propylene was polymerized in essentially the same manner described in EXAMPLE I. The recycle gas and quench liquid were propylene. The melter temperature was 350° F. while the catalyst kill section operated at 400° F. An active titanium chloride catalyst (33 milligrams) with diethylaluminum chloride cocatalyst (77 milligrams), mol ratio Al/Ti=3, was charged to the reactor every 30 minutes. Hydrogen was added as needed to maintain 2.9 mol percent in the reactor gas cap. The reactor temperature was maintained at 160° F. and the reactor pressure was controlled at 300 psig by controlling temperature in the recycle condenser at about 120° F. A polymer yield based on catalyst of 10,000 grams/gram was obtained. The polymer was removed from the reactor as a melt. The polymer showed a melt flow rate of 16.4 grams/10 minutes at 230° C. under a load of 2,060g. The 68° C. n-hexane extractables was 4.0 weight percent.

EXAMPLE V

Ethylene was polymerized in the same manner described in EXAMPLE I except in this case two sections of the reactor were maintained at different temperatures. Reactor section one was operated at 160° F. while reactor section two was operated at 210° to 230° F. This was accomplished by varying the amount of isopentane quench added to each section. The catalyst used was a supported titanium compound and an aluminum triethyl cocatalyst was added in a weight ratio of cocatalyst to catalyst of three to one. The reactor pressure was controlled at 300 psig. and the hydrogen concentration was maintained at 40 mol percent. A polymer yield of 62,000 grams of polymer/gram of catalyst was obtained. The polymer melt index was measured at 5.5 with a $MF_{10}/MF_1$ of about 40 and a spiral flow of 18 inches. Polymer made under single temperature conditions having the same M.I. shows an $MF_{10}/MF_1$ value of about 34 and demonstrated a spiral flow of about 16 inches.

Spiral flow is an empirical method of assessing ease of processability of a polymer by measuring the length of flow in a special mold under specific temperature and pressure conditions. The longer the spiral flow the easier is the processability.

What is claimed is:

1. A process for treating polymer made by the polymerization of at least one polymerizable monomer in a vapor state reactor comprising removing without substantial pressure letdown solid polymer from said vapor state reactor together with reactor off-gases into a post polymerization zone into which a controlled amount of said monomer is introduced and wherein a controlled amount of essentially adiabatic polymerization occurs and said polymer is melted by heat from said adiabatic polymerization and externally added heat to form efficiently transferable, molten polymer.

2. In the process of claim 1, the additional steps comprising:

a. admixing with said molten polymer a catalyst component decomposing substance and one or more additives while still maintaining the polymer in the molten state;

b. removing volatile material from the product of (a) to form a molten, devolatilized product; and c. cooling, said molten, devolatilized product to ambient temperature.

3. The process of claim 1 wherein said monomer is at least ethene.

4. The process of claim 1 wherein said monomer is at least propene.

5. The process of claim 1 wherein said monomer is at least butene-1.

6. The process of claim 1 wherein said monomer is at least vinyl chloride.

7. The process of claim 1 wherein said monomer is at least 4-methyl-pentene-1.

8. The process of claim 1 wherein said monomer is at least a butadiene.

9. The process of claim 1 wherein said monomer is at least a styrene.

10. The process of claim 2 wherein said monomer is at least ethene.

11. The process of claim 2 wherein said monomer is at least propene.

12. The process of claim 2 wherein said monomer is at least butene-1.

13. The process of claim 2 wherein said monomer is at least vinyl chloride.

14. The process of claim 2 wherein said monomer is at least 4-methyl-pentene-1.

15. The process of claim 2 wherein said monomer is at least a butadiene.

16. The process of claim 2 wherein said monomer is at least a styrene.

17. [The] *A* process [of claim 1 wherein said] *for treating polymer made by the polymerization of at least one polymerizable monomer in a vapor state reactor comprising removing without substantial pressure letdown solid polymer from said vapor state reactor together with reactor off-gases into a post polymerization zone into which a controlled amount of said monomer is introduced and wherein a controlled amount of essentially adiabatic polymerization occurs and said polymer is melted by heat from said adiabatic polymerization in the absence of* externally added heat [is absent] *to form efficiently transferable, molten polymer.*

18. In the process of claim 17, the additional steps comprising:

a. admixing with said molten polymer a catalyst component decomposing substance and one or more additives while still maintaining the polymer in the molten state;

b. removing volatile material from the product of (a) to form a molten, devolatilized product; and c. cooling said molten, devolatilized product to ambient temperature.

19. The process of claim 18 wherein said monomer is at least ethene.

20. The process of claim 18 wherein said monomer is at least propene.

21. A process for treating polymer made by the polymerization of at least one polymerizable monomer in a vapor state reactor comprising removing without substantial pressure letdown solid polymer from said vapor state reactor together with reactor off-gases into a post polymerization zone into which a controlled amount of polymerizable monomer is introduced and wherein a controlled amount of essentially adiabatic polymerization occurs and said polymer is melted by heat from said adiabatic polymerization and externally added heat to form efficiently transferable, molten polymer.

22. In the process of claim 21, the additional steps comprising:

a. admixing with said molten polymer a catalyst component decomposing substance and one or more additives while still maintaining the polymer in the molten state;

b. removing volatile material from the product of (a) to form a molten, devolatilized product; and (c) cooling said molten, devolatilized product to ambient temperature.

* * * * *